United States Patent [19]

Ichikawa

[11] 4,450,811
[45] May 29, 1984

[54] CONTROLLER FOR INTERNAL COMBUSTION ENGINE

[75] Inventor: Sadao Ichikawa, Aichi, Japan

[73] Assignee: NGK Spark Plug Co., Ltd., Nagoya, Japan

[21] Appl. No.: 430,225

[22] Filed: Sep. 30, 1982

[30] Foreign Application Priority Data

Oct. 8, 1981 [JP] Japan .................................. 56-160822

[51] Int. Cl.³ .............................................. F02P 5/04
[52] U.S. Cl. .................................... 123/425; 123/435; 73/35
[58] Field of Search ...................... 123/425, 435; 73/35

[56] References Cited

U.S. PATENT DOCUMENTS

| 2,401,563 | 6/1946 | Hepsey | 123/425 |
| 3,875,912 | 4/1975 | Bullo | 123/425 |
| 4,012,942 | 3/1977 | Harned | 123/425 |
| 4,153,019 | 5/1979 | Laubenstein | 123/425 |
| 4,243,008 | 1/1981 | Omori | 123/425 |

FOREIGN PATENT DOCUMENTS 2731069  1/1979  Fed. Rep. of Germany ....... 123/425

Primary Examiner—Ronald B. Cox
Attorney, Agent, or Firm—Sughrue, Mion, Zinn, Macpeak, and Seas

[57] ABSTRACT

A controller for controlling the combustion timing of an internal combustion engine and a method for controlling the ignition timing of an internal combustion engine in which variations in combustion timing as detected from the pressure in the combustion chamber of the engine and the intensity of knocking are simultaneously detected and the ignition timing corrected to provide optimum combustion efficiency at all times. From the sensed pressure in the combustion chamber, the crank angle at which the maximum pressure occurs is determined. If the crank angle thus determined exceeds a first reference value, a first ignition time correcting signal is generated. If the knocking intensity exceeds a second reference value, a second ignition timing correcting signal is generated. The output signal utilized to correct the ignition timing is produced by selecting one of the two ignition timing correcting signals thus generated, wherein the second ignition timing correcting signal has priority over the first ignition timing correcting signal.

3 Claims, 6 Drawing Figures

CONTROLLER FOR INTERNAL COMBUSTION ENGINE

BACKGROUND OF THE INVENTION

The present invention relates to a controller for an internal combustion engine. More particularly, the invention relates to a method of an apparatus for adjusting the ignition timing of an engine in such a manner as to suppress knocking without excessive delays of ignition, thereby to provide a high engine efficiency at all times.

In recent years, there has been a trend in the field of internal combustion engines towards the use of lean mixture combustion to provide reduced fuel consumption and cleaner exhaust emissions. Also, it has become more common to use superchargers to achieve higher combustion efficiency. With these techniques, remarkable improvements have been achieved.

These newly developed techniques have, however, been accompanied by problems such as fluctuations of the fuel flow rate due to increased fluctuation of the crank angle at which the maximum pressure of the combustion gas is established. Also, knocking problems have become more severe. As is well known, the generation of knocking increases vibratory pressures with the frequency of the vibratory pressure being related to the pressure in the combustion chamber. Hitherto, in order to minimize knocking, feedback control of ignition timing has been implemented utilizing sensing of the vibratory pressure with a vibration sensor attached to the engine body with the ignition timing being adjusted in accordance with the output of the sensor. This conventional control system, however, is unsatisfactory from the viewpoint of reducing fuel consumption in engines designed to operate with a lean air-to-fuel ratio mixture.

SUMMARY OF THE INVENTION

In order to overcome these drawbacks, the present invention provides a method and apparatus for controlling combustion in an internal combustion engine in which both variations in combustion timing and knocking are detected simultaneously, and signals indicative of these parameters are employed to optimize combustion efficiency.

More specifically, according to one aspect of the invention, there is provided a method of controlling combustion in an internal combustion engine including the steps of sensing, using a pressure sensor, the crank angle corresponding to the time of generation of maximum pressure in the combustion chamber, and, if the sensing output signal is delayed beyond a predetermined reference value, advancing the angle of ignition timing corresponding to the frequency of occurrence of such delays and/or the amount of delay; and sensing, by means of a knock sensor, the knocking intensity and, if the knock sensing output signal is higher than a predetermined reference level, effecting an adjustment of the advance angle of the ignition timing corresponding to the frequency of such an output and/or the amount by which the reference level is exceeded.

According to another aspect of the invention, there is provided a controller for a internal combustion engine including a pressure sensor for sensing changes in the gas pressure within the combustion chamber of the engine; a circuit for detecting the moment of maximum pressure from the output of the pressure sensor; a maximum-pressure crank angle detecting circuit receiving as one input thereto the maximum-pressure moment signal; a first comparator circuit for comparing the output from the maximum-pressure crank angle detecting circuit with a reference value to produce a signal for correcting the ignition timing in response to the result of the comparison; a circuit for detecting the knocking intensity from the output of the pressure sensor; a second comparator for comparing the knocking intensity signal with a reference value and for producing a delay correction signal for correcting the ignition timing in response to the result of the comparison; and a selection circuit for selectively delivering the output from the first comparator circuit or the output from the second comparator circuit thereby to effect feedback control of combustion through adjustment of ignition timing.

DESCRIPTION OF THE PREFERRED EMBODIMENTS

The invention will now be described in detail with reference to preferred embodiments.

Figure 1:
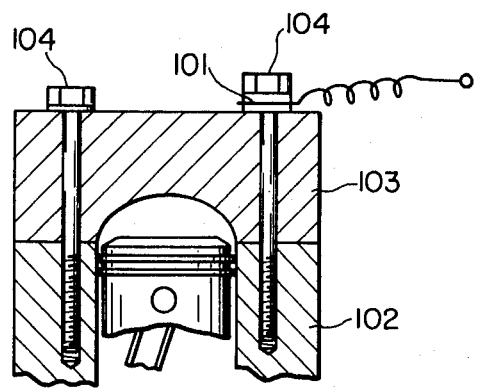
FIG. 1 is a pressure sensor attached to a cylinder head for use in an internal engine controller of the invention.

Referring first to FIG. 1, reference numeral 101 denotes a pressure sensor of a type having two superposed structures, each of which includes a lead titanate-zirconate piezoelectric element covered on both sides with metal layers to form a laminated structure. Electrode plates are interposed between the two structures. The pressure sensor 101 is mounted in the fashion of a washer with a head bolt 104 on a cylinder head 103 on the cylinder block 102. In multi-cylinder engines, plural such pressure sensors 101 are provided for plural selected cylinders with each sensor mounted with a head bolt on which is imposed the internal pressure of the corresponding cylinder. The pressure sensors in that case are electrically connected in parallel with one another to provide a single output.

Figure 4B:
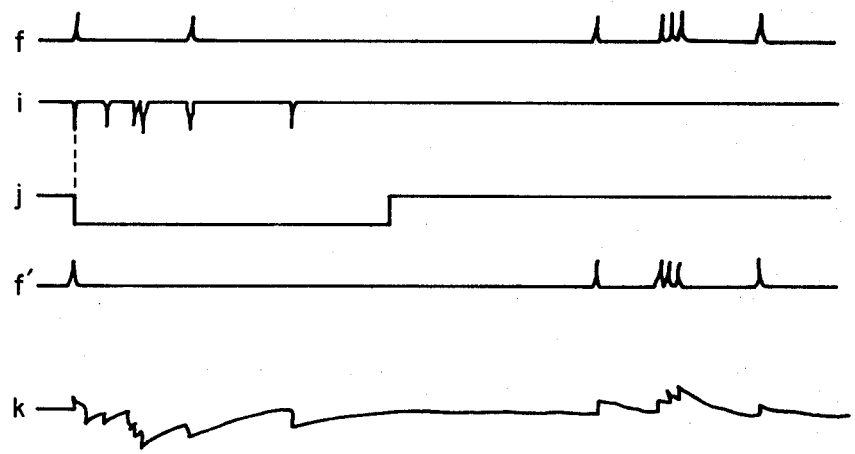
FIGS. 4A and 4B are timing charts showing waveforms of various signals in the circuits shown in FIGS. 2 and 3 at locations designated by corresponding symbols.
Figure 2:
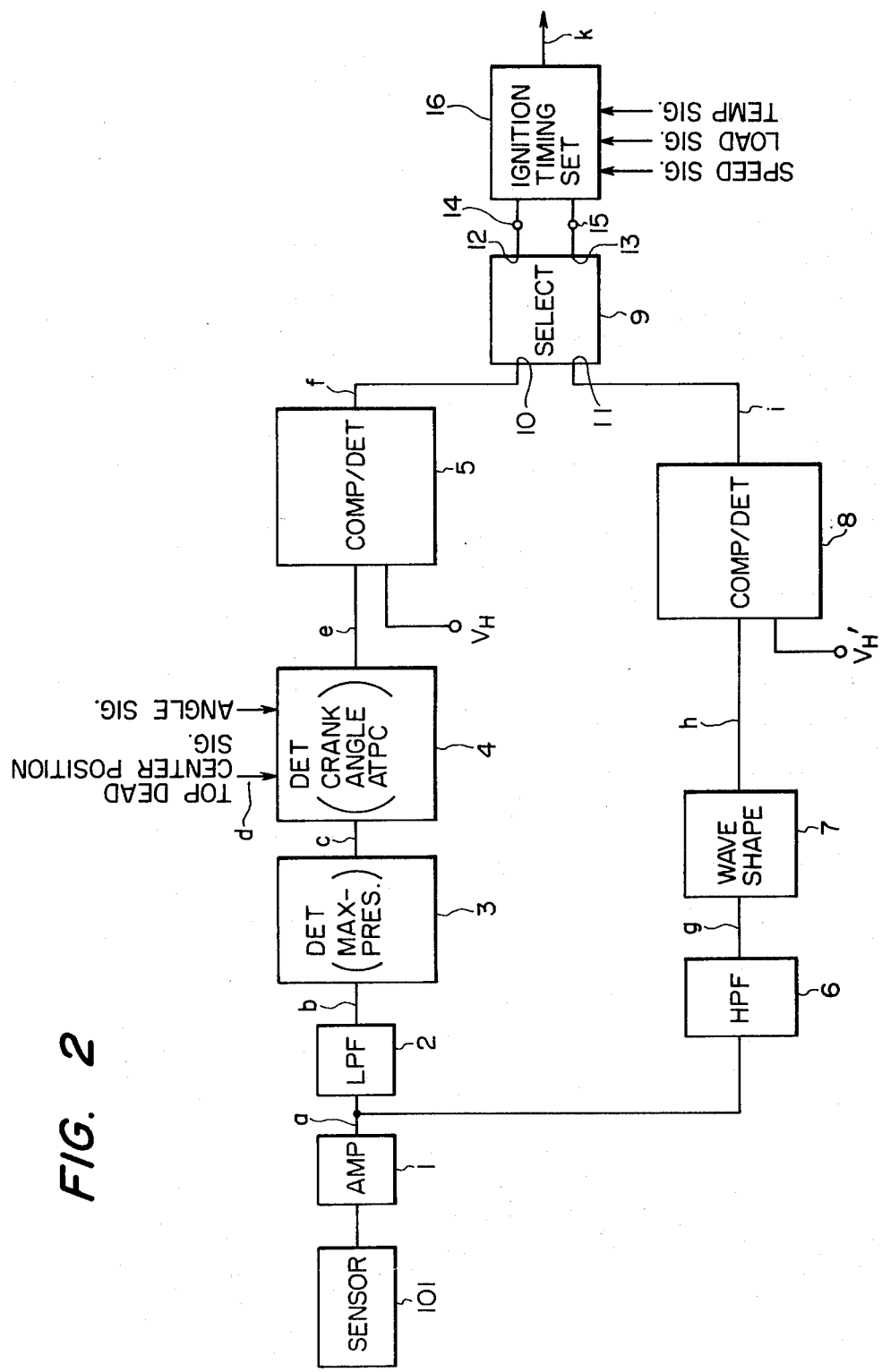
FIG. 2 is a block diagram of an internal engine controller of a preferred embodiment of the invention.
Figure 4A:
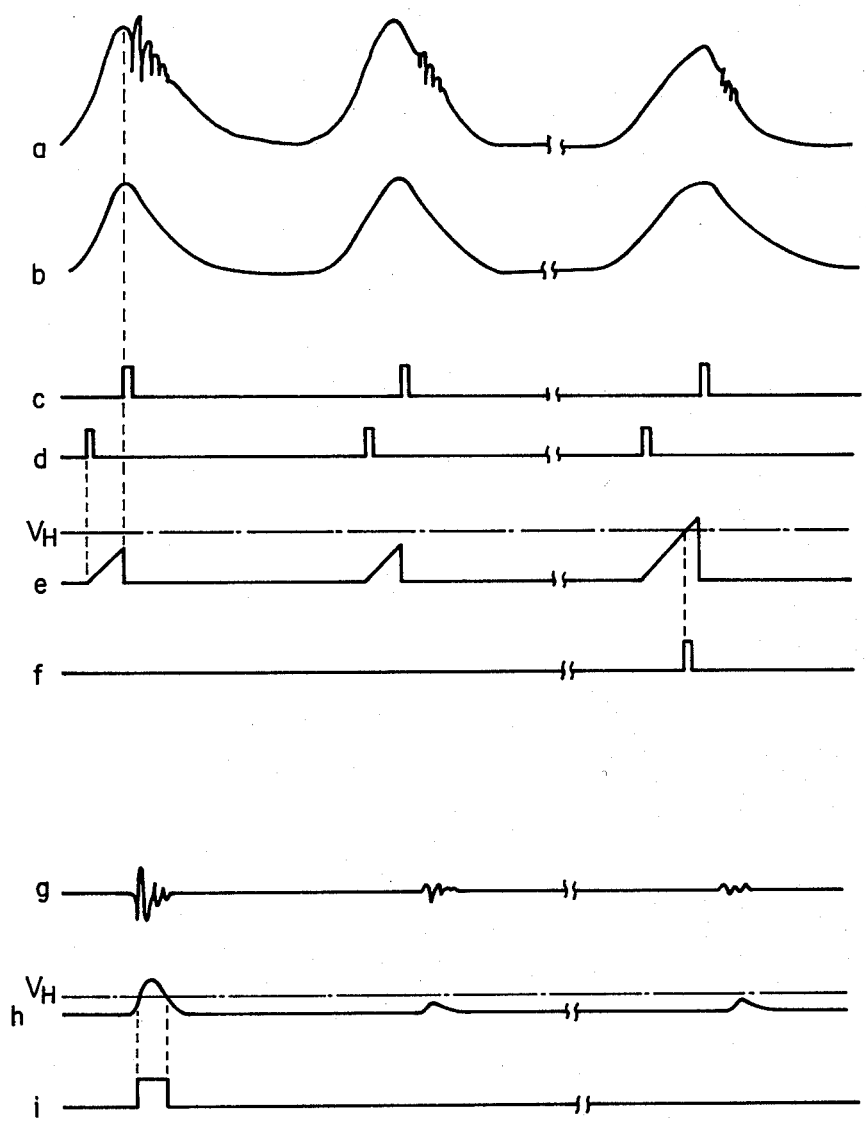

Referring now to FIG. 2, which is a block diagram of a control apparatus of the invention, a high input impedance amplifier 1 boosts the output from the sensor 101 to produce a waveform indicated as a signal a in FIG. 4A. The signal a is smoothed by a lowpass filter 2 to provide a signal b in FIG. 4A. Reference numeral 3 denotes a circuit, implemented with a differentiating circuit, which is used to detect the moment at which the pressure waveform reaches its maximum value. Reference numeral 4 denotes a circuit which detects the crank angle corresponding to the moment of maximum pressure.

A first projection is provided on one side, for instance, of a disc which is directly connected to the crank shaft at a position suitable for indicating the top-dead-center (TDC) crank position, and a first angle sensor (reference sensor) is disposed adjacent the path of rotation of this projection. It is also possible to use plural projections, two or three, for instance, for this purpose. A set of second projections is formed on the periphery of the disc at positions removed from the first set of projections at angular intervals of 1°, for instance. A second angle sensor is disposed in the vicinity of the path of rotation of the latter projections.

Figure 5:
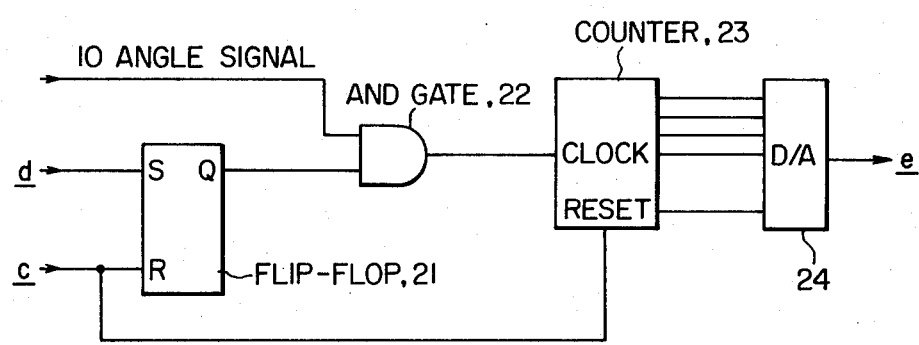
FIG. 5 is a logic diagram of a detecting circuit (reference numeral 4) used in the controller of FIG. 2.

With reference to FIG. 5, the circuit 4 for detecting the crank angle corresponding to the moment of maximum pressure includes an RS flip-flop 21 which receives the output (signal c in FIG. 4A) from the circuit 3 indicating the moment of maximum pressure on its R (Reset) input and the output (signal d in FIG. 4A) from the first (reference) crank angle position sensor on its S (Set) input. The circuit 4 further includes an AND gate 22 which receives the output Q from the flip-flop 22 and the 1° angle signal from the second sensor. An integrator circuit composed of a counter 23 and D/A converter 24 is provided for integrating the output of the AND gate 22. The counter 23 is reset to the all zeroes state by the signal c. With this arrangement, the height of the output (signal e in FIG. 4A) from the integrator circuit represents the crank angle at the moment of maximum cylinder pressure.

An angle comparator/detector circuit 5 compares the signal e with a preset reference (limit) value $V_H$ and produces, when the reference value is exceeded, a signal in the form of pulses constituting an ignition timing correction signal (advance angle correction signal in this case), shown as signal f in FIG. 4A. Reference numeral 6 denotes a knock frequency bandpass filter (high-pass filter). The output from the pressure sensor (signal a in FIG. 4A) is modified into the signal g in FIG. 4A as it passes through the filter 6. A wave-shaping circuit 7 rectifies and smoothes the signal g thereby to produce an output (signal h in FIG. 4A) representing the intensity of knocking. A knock intensity comparator/detector circuit 8 compares the knock intensity signal h with a reference (limit) value $V_H'$ and produces, when the reference value is exceeded, a delay angle correction signal (signal i in FIG. 4A) for the ignition timing in the form of a pulse signal.

Figure 3:
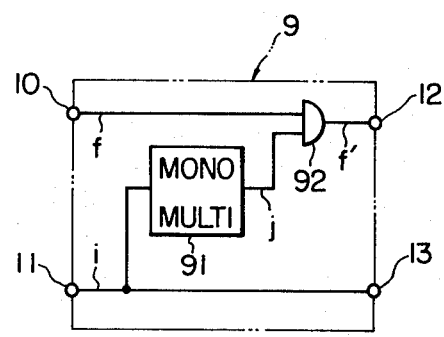
FIG. 3 shows the details of a selection circuit used in the controller of FIG. 2.

A selection circuit 9 is provided to select one of the two correction signals (signal f and i). The selection circuit, as shown in FIG. 3 of the preferred embodiment, gives priority to the ignition timing delay angle correction signal i for suppressing knocking. When this signal is in the active state, a monostable multivibrator 91 is triggered to produce an output which is applied to the gate of an AND gate circuit 92 which gates the ignition timing correction signal f, thereby to cut-off the combustion delay correction signal f by producing an output signal f', as seen in FIG. 4B. The selection circuit 9 may be of a type which is switchable according to a specific operating parameter of the engine between a first mode in which terminals 10 and 11 are connected to each other while terminals 12 and 13 are disconnected from each other and a second mode in which terminals 10 and 11 are disconnected from each other while terminals 12 and 13 are connected to each other.

Reference numeral 16 denotes an ignition timing setting (computing) device of known construction which computes and determine the optimum ignition timing from signals from outputs of an engine speed sensor, a load sensor (boost pressure sensor) and a coolant temperature sensor and, in response thereto, applies an ignition signal to an ignition coil. The ignition timing setting device 16 is capable of correcting the ignition timing in accordance with signals applied through signal input terminals 14 and 15. In FIG. 4B, waveform k illustrates the manner of correction of the ignition timing in accordance with the above-described correction signal.

As has been described above, according to the invention, both the delay of combustion and the generation of knocks are sensed and the correction of the ignition timing is effected selectively in accordance with the sensed parameter. As a consequence, according to the invention, the combustion efficiency of the engine is significantly improved while exhaust emissions are advantageously simultaneously reduced.

I claim:

1. A method for controlling the combustion in an internal combustion engine, comprising the steps of: sensing a crank angle of said engine corresponding to a time of maximum pressure in a combustion chamber of said engine; sensing a reference crank angle; providing a first ignition timing correcting signal when the sensed crank angle is delayed beyond said reference crank angle; sensing a knocking intensity; producing a second signal for correcting said ignition timing when said sensed knocking intensity exceeds a predetermined reference level; and effecting correction of said ignition timing in response to one of said first and second ignition timing correcting signal with said second ignition timing correcting signal having priority over said first ignition timing correcting signal, and wherein said step of correcting said ignition timing in accordance with one of said first and second ignition timing correcting signals comprises inhibiting said first ignition timing correcting signal for a predetermined time period in response to said second ignition timing correcting signal.

2. A controller for controlling the combustion in an internal combustion engine comprising: a pressure sensor for sensing a gas pressure within a combustion chamber of said engine; means for detecting a moment of maximum pressure from an output of said pressure sensor; a crank angle sensor; a maximum-pressure crank angle detecting circuit for determining in response to outputs from said pressure detecting means and said crank angle sensing means a crank angle at which a maximum pressure in said combustion chamber occurs; first comparing means for comparing an output of said maximum-pressure crank angle detecting circuit with a first predetermined reference value for producing a first ignition timing correcting signal when the crank angle at which said maximum pressure occurs exceeds said first predetermined reference value; knocking intensity detecting means operating in response to an output of said pressure detector; second comparing means for comparing a knocking intensity signal produced by said knocking intensity detecting means with a second predetermined reference value for producing a second ignition timing correcting signal when the detected knocking intensity exceeds said second predetermined reference value; and selecting circuit means for delivering as an output ignition timing correcting signal one of said first and second ignition timing correcting signals, wherein said second ignition timing correcting signal has priority over said first ignition timing correcting signal, and wherein said selecting means comprises means for inhibiting from said output ignition correcting signal said first ignition timing correcting signal for a predetermined time after said second ignition timing correcting signal is received.

3. A controller for controlling the combustion in an internal combustion engine comprising: a pressure sensor for sensing a gas pressure within a combustion chamber of said engine; means for detecting a moment of maximum pressure from an output of said pressure sensor; a crank angle sensor; a maximum-pressure crank angle detecting circuit for determining in response to outputs from said pressure detecting means and said crank angle sensing means a crank angle at which a maximum pressure in said combustion chamber occurs; first comparing means for comparing an output of said maximum-pressure crank angle detecing circuit with a first predetermined reference value for producing a first ignition timing correcting signal when the crank angle at which said maximum pressure occurs exceeds said first predetermined reference value; knocking intensity detecting means operating in response to an output of said pressure detector; second comparing means for comparing a knocking intensity signal produced by said knocking intensity detecting means with a second predetermined reference value for producing a second ignition timing correcting signal when the detected knocking intensity exceeds said second predetermined reference value; and selecting circuit means for delivering as an output ignition timing correcting signal one of said first and second ignition timing correcting signals, wherein said second ignition timing correcting signal has priority over said first ignition timing correcting signal, and wherein said crank angle sensor comprises a disc coupled to be rotated by the crank of said engine, said disc having a first projection at a position indicative of a top-dead-center crank angle, and a plurality of second projections spaced at equal intervals on said disc; and first and second stationarily mounted projection sensors for sensing said first projection and said projections, respectively, for producing a top-dead-center position signal and an incremental angle signal, respectively, said first comparing means comprising an RS flip-flop, an AND gate, a counter, and an analog-to-digital converter, said flip-flop having an R input coupled to receive said maximum-pressure signal outputted by said pressure detecting means, an S input coupled to receive said top-dead-center position signal, and a Q output coupled to a first input of said AND gate, said AND gate having a second input coupled to receive said incremental angle signal and an output coupled to a clock input of said counter, said counter having a reset input coupled to said R input of said flip-flop and outputs coupled to digital inputs of said digital-to-analog converter, an output of said digital-to-analog converter forming said first ignition timing correcting signal.

* * * * *